(12) United States Patent
Nayak et al.

(10) Patent No.: US 8,184,011 B2
(45) Date of Patent: May 22, 2012

(54) VISUAL INDICATION OF FAULT STATUS, STORAGE AND CLEARANCE IN AN ARC FAULT CIRCUIT INTERRUPTER (AFCI)

(75) Inventors: Amit Nayak, Atlanta, GA (US); Carlos Restrepo, Atlanta, GA (US); Brian Timothy McCoy, Lawrenceville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 486 days.

(21) Appl. No.: 12/574,449

(22) Filed: Oct. 6, 2009

(65) Prior Publication Data

US 2010/0085206 A1 Apr. 8, 2010

Related U.S. Application Data

(60) Provisional application No. 61/103,598, filed on Oct. 8, 2008.

(51) Int. Cl.
*G08B 21/00* (2006.01)
*H02H 7/00* (2006.01)

(52) U.S. Cl. ........ 340/657; 340/662; 340/664; 340/650; 361/42

(58) Field of Classification Search .................. 340/635, 340/649, 650, 657, 662, 664; 361/42, 44, 361/62, 93.1; 324/423, 424
See application file for complete search history.

(56) References Cited

U.S. PATENT DOCUMENTS

| | | | |
|---|---|---|---|
| 5,546,266 A | 8/1996 | Mackenzie | |
| 6,472,877 B1 * | 10/2002 | Sands | 324/423 |
| 7,440,245 B2 * | 10/2008 | Miller et al. | 361/42 |
| 7,460,346 B2 * | 12/2008 | Deshpande et al. | 361/62 |
| 2005/0254187 A1 * | 11/2005 | Chu | 361/42 |
| 2007/0297113 A1 | 12/2007 | Domitrovich | |
| 2008/0174922 A1 * | 7/2008 | Kimbrough | 361/42 |
| 2008/0204947 A1 | 8/2008 | Parker | |

* cited by examiner

*Primary Examiner* — Van T. Trieu

(57) ABSTRACT

An arc fault detector includes a means for repeatedly measuring an elapsed time. The arc fault detector also includes at least one means to perform arc detection at each repeated elapsed time. Means for initiating a tripping mechanism is activated after the elapsed time. When a fault occurs, means for generating at least one fault code is activated. The fault code is stored in at least one non-volatile memory. The fault code is selected from a group consisting of an arc fault interrupt code, a ground fault interrupt code, and a push-to-test interrupt code. The arc fault detector includes at least one means to display the fault code such as at least one LED. At least a first LED indicates an arc fault interrupt code and at least a second LED indicates a ground fault interrupt code. At least a third LED indicates a push-to-test interrupt code.

35 Claims, 6 Drawing Sheets

VISUAL INDICATION OF FAULT STATUS, STORAGE AND CLEARANCE IN AN ARC FAULT CIRCUIT INTERRUPTER (AFCI)

CROSS-REFERENCE TO RELATED APPLICATIONS

The instant patent application claims priority to and the benefit of pending U.S. patent application Ser. No. 11/978,969, filed on Oct. 30, 2007, titled "Systems And Methods For Arc Fault Detection," the entire disclosure of which application is incorporated herein by reference.

The instant patent application also claims priority to and the benefit of pending U.S. patent application Ser. No. 12/405,340, filed on Mar. 17, 2009, titled "Multifunctional Residential Circuit Breaker," the entire disclosure of which application is incorporated herein by reference.

The instant patent application also claims priority to and the benefit of pending U.S. Provisional Patent Application Ser. No. 61/103,598, filed on Oct. 8, 2008, titled "Visual Indication of Fault Status, Storage and Clearance in an Arc Fault Circuit Interrupter (AFCI)," the entire disclosure of which provisional application is incorporated herein by reference.

FIELD OF THE INVENTION

The present invention relates generally to a Fault Circuit Interrupter (FCI). More particularly, the invention encompasses a visual indication of fault status, storage and clearance in an arc fault circuit interrupter (AFCI) or a ground fault circuit interrupter (GFCI). The present invention is also directed to a novel visual indication of fault status, storage and clearance in an arc fault circuit interrupter (AFCI) and/or a ground fault circuit interrupter (GFCI) combination device.

BACKGROUND INFORMATION

Arc detection is an enhancement to thermal magnetic overload detection typically used in circuit breakers, which otherwise may not detect and respond to arc faults. A number of devices for detecting arc faults and methods of detection have been used in the past. These include the use of electrical (E) and magnetic (B) field arc sensors, detecting the amplitude of the rate of change of current signals when an arc fault occurs, the use of non-overlapping band pass filters to detect white noise that is characteristic of arcs, and detecting the disappearance of signals indicating the presence of arcs near zero current crossings. While some of these techniques are more or less effective, they require relatively sophisticated arc sensors and circuits and heretofore, most of these arc detection circuits have been incorporated in circuit breakers.

A number of devices and methods for detecting ground faults have been used in the past. Typically, ground faults are detected using B field sensors for sensing a difference between line neutral current together with integrators or low pass filters and are more or less effective. Heretofore, ground fault detection circuits have been incorporated in circuit breakers or receptacles.

U.S. Pat. No. 5,729,145 (Frederick K. Blades), the entire disclosure of which is incorporated herein by reference, discloses where an arcing in an AC power system is detected by monitoring the power waveform for wideband high-frequency noise, and examining the detected noise for patterns of variation in its amplitude synchronized to the power waveform. A narrowband, swept-frequency detector and synchronous averaging may be employed to improve discrimination of arc noise from background interference. An arcing fault interrupter for controlling a single circuit, and a whole house monitor, for detecting arcing anywhere in a house, are described. Also disclosed is an arc fault detection system with visual indicators. The device circuit includes a microprocessor that illuminates the green status light under normal conditions. The invention also discloses a method to relay a reported "health" of the electrical system by using different colors. In case of possible hazardous arcing, the microprocessor turns off the green light and illuminates the yellow light. This light remains illuminated until reset by the user that is done by depressing the reset button. In case when the arcing is deemed demonstrably hazardous, the microprocessor turns off the yellow light, and turns on the red light, indicating that a serious hazard exists. When this happens, microprocessor also periodically beeps the audible enunciator to call attention to the load center and inform the residents of the hazard. This detector must be manually reset by depressing the reset switch to clear the alarm status and reset the green light.

U.S. Pat. No. 6,421,214 (Thomas N. Packard, et al.), the entire disclosure of which is incorporated herein by reference, discloses a self-testing arc fault or ground fault detector includes arc fault detecting circuitry and components. The detector includes a testing circuit that tests at least part of the circuitry and components and generates a recurring signal when the test completes successfully. If the test does not complete successfully, the signal is lost. This loss of signal is signaled by an indicator connected to the testing circuit. In one version, the loss of signal activates a circuit interrupter that disconnects the load side of the detector from the line side. The use of a combination of lights to illuminate and indicate malfunction and/or faults is also disclosed.

U.S. Pat. No. 6,426,634 (Robert Henry Clunn, et al.), the entire disclosure of which is incorporated herein by reference, discloses a circuit switching device or circuit breaker with integrated self-test enhancements. The circuit breaker has separable contacts operable under processor control to control power to a circuit responsive to at least one of a plurality of fault conditions. The circuit breaker is operable according to a method for testing, the method includes the step of: controlling the switching device during a sampling cycle, to input one or more operating parameters sensed in the circuit to an A/D converter for measurement. The operating parameters enable detection of the fault conditions. The method continues by determining whether to read a select one of the operating parameters from an output of the A/D converter into a first memory. The pre-determined parameter values are read from a second memory into the first memory during the sampling cycle. The pre-determined parameter values are read instead of the operating parameters read from the A/D converter if a self-test has been invoked during the sampling cycle. Also, disclosed is that during the self-diagnostic tests for an arc fault protection device, if failures occur, the trip and/or fault code corresponding to the fault can be stored in the memory of a central processing unit (CPU). This code can be recovered by service personnel for further examination using RS-232 communications port.

It should be appreciated that the "visual indicators" of the prior art do not have the ability to remember what happened once the circuit breaker has been reset. If the user or homeowner locates or determines the presence of an electronic trip, the visual indicators may show whether the trip conditions was electronically generated, such as, GFCI or AFCI related, and upon resetting the circuit breaker, and if the condition does not repeat, the information is lost.

Similarly, the prior art visual indicators only display whether the fault was generated due to an arc/ground fault or an over-current fault. However, there is no way of telling specifically if the fault was an arc fault or a ground fault.

Furthermore, the prior art multiple visual indicators, which are in the form of different colors while the device is in operation require periodic monitoring by the user or operator to understand the effect of the color change, thereby, creating a burden for the user or operator to regularly open the load center.

Additionally, display of indicators in different frequencies to depict malfunction and/or faults is dependent on the correct interpretation of the human vision. There is a strong emphasis on the ability to detect and differentiate the separate flashing rates. This might cause erroneous judgment and result in false diagnosis.

The audible indicators of the prior art also do not result in a safe shutting off the device. Though they bring the arc fault detection to the user's notice, they do not function as intended by shutting off the current supply when an arc is detected. This becomes more apparent if the user is not physically present at the location when the arc fault is detected. In other words, manual intervention is necessary to fully check the device as well as recognize the correct operation and status. If the user is not present, the device might continue to produce the audible alarm instead of disarming and preventing further damage.

Therefore, there is a need for improvement in a fault circuit interrupter (FCI), and in particular in a visual indication of fault status, storage and clearance in an arc fault circuit interrupter (AFCI) and/or a ground fault circuit interrupter (GFCI).

This invention improves on the deficiencies of the prior art and provides an inventive visual indication of fault status, storage and clearance in an Arc Fault Circuit Interrupter (AFCI).

PURPOSES AND SUMMARY OF THE INVENTION

The invention is a novel visual indication of fault status, storage and clearance in an Arc Fault Circuit Interrupter (AFCI) and/or a ground fault circuit interrupter (GFCI).

Therefore, one purpose of this invention is to provide a visual indication of fault status, storage and clearance in an Arc Fault Circuit Interrupter (AFCI) and/or a ground fault circuit interrupter (GFCI).

Another purpose of this invention is to provide a reliable solution to use a visual indication of fault status, storage and clearance in an Arc Fault Circuit Interrupter (AFCI).

Yet another purpose of this invention is to provide a robust visual indication of fault status, storage and clearance in an Arc Fault Circuit Interrupter (AFCI) and/or a ground fault circuit interrupter (GFCI).

Therefore, in one aspect this invention comprises an arc fault detector that includes a means for repeatedly measuring an elapsed time. The arc fault detector also includes at least one means to perform arc detection at each repeated elapsed time. Means for initiating a tripping mechanism is activated, if tripping requirements are met based on at least one input from the at least one means to perform the arc detection. When a fault occurs, means for generating at least one fault code is activated. The fault code is stored in at least one non-volatile memory. The fault code is selected from a group consisting of an arc fault interrupt code, a ground fault interrupt code, and a push-to-test interrupt code.

The arc fault detector includes at least one means to display the fault code such as at least one LED. At least a first LED indicates an arc fault interrupt code and at least a second LED indicates a ground fault interrupt code. At least a third LED indicates a push-to-test interrupt code.

In other embodiments, an arc fault detector has at least one means for displaying the fault code stored in the at least one non-volatile memory after a first period of time. The first period of time is at least 40 ms. The at least one means for displaying the fault code displays the fault code for at least a second period of time. The at least second period of time is at least 5 seconds.

In some embodiments, the arc fault detector includes at least one means to determine a third period of time when the fault code stored in the at least one non-volatile memory is to be cleared. The arc fault detector further includes at least one means to determine that a push-to-test activator has been actuated for at least a fourth period of time. At least one means to clear the fault code stored in the at least one non-volatile memory is activated after the third time. The third period of time is at least 20 ms. The arc fault detector also includes means to determine if the third period of time is greater than a memory hold time value and then to initiate the at least one means to clear the fault code stored in the at least one non-volatile memory. The memory hold time value is at least 40 ms.

In some embodiments, the means for displaying the fault code is a single indicator that displays an arc fault, and a dual indicator that displays a ground fault. The means for displaying the fault code is at least one indicator activated at a single frequency to indicate that the arc fault detector has failed.

In other embodiments, a method for detecting electrical faults starts by repeatedly measuring an elapsed time then detecting at least one electrical fault at each repeated elapsed time. The method continues by initiating a tripping mechanism, if tripping requirements are met based on detecting at least one electrical fault. At least one fault code is generated upon detecting at least one electrical fault stored in at least one non-volatile memory. The fault code is selected from a group consisting of an arc fault interrupt code, a ground fault interrupt code, and a push-to-test interrupt code.

The method for detecting electrical faults further includes displaying visually the fault code. The displaying visually the fault code comprises activating at least one LED. The displaying visually the fault code comprises activating at least a first LED to indicate an arc fault interrupt code. The displaying visually the fault code comprises activating at least a second LED to indicate a ground fault interrupt code. The displaying visually the fault code comprises activating at least a third LED to indicate a push-to-test interrupt code.

In other embodiments the method for detecting electrical faults includes displaying the fault code stored in the at least one non-volatile memory after a first period of time. The first period of time is at least 40 ms. The displaying the fault code comprises activating a display for at least a second period of time. The at least second period of time is at least 5 seconds.

In some embodiments, the method for detecting electrical faults includes determining a third period of time when the fault code stored in the at least one non-volatile memory is to be cleared and determining that a push-to-test activator has been actuated for at least a fourth period of time. The fourth period of time is at least 20 ms. The third period of time is determined if it is greater than a memory hold time value. The fault code stored is cleared in the at least one non-volatile memory. The memory hold time value is at least 40 ms.

In some embodiments, the displaying the fault code comprises activating a single indicator that displays an arc fault, and activating a dual indicator that displays a ground fault. The displaying the fault code comprises activating at least one indicator at a single frequency to indicate that means for detecting electrical faults has failed.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which.

DETAILED DESCRIPTION

The ability to visually display states or results, which have been deemed as reasons for faults and causes for an Arc Fault Circuit Interrupter (AFCI) device to disengage and de-energize, is a novel method of user interface. This invention utilizes encoded visual indication via LEDs (Light Emitting Diodes) to make it easier for the user or operator to understand the state of the device or the type of fault that caused the device to trip. Once the device has been tripped, the power is disconnected, and with this invention, the potential for retaining the fault reason or cause is now possible. The fault reason/cause can be stored into non-volatile memory (NVM) before the device is tripped to prevent such an occurrence. The device during power-on can retrieve this information from non-volatile memory and display the expected LED indication. For purposes of functional tests in factory level, a method to clear the contents of the non-volatile memory is also available so that future power-on does not display the fault states even after full functional tests have been conducted under factory conditions. The clearing of stored fault allows a user or an operator in the field a novel method to remove fault status from AFCI after the root cause of the fault has been identified and fixed. It is imperative for this purpose to create a simple yet effective non-invasive method of fault reading and clearance methodology. Furthermore, the LED indication can be used to display erroneous AFCI tripping mechanism failure in the form of flashing LEDs at specific frequency if the push-to-test (PTT) does not cause a trip.

The invention is also used to provide a defined approach and process to display and clear the fault causes and reasons that forced the arc fault circuit interrupter (AFCI) device to undergo a trip condition and disengage it from the active circuit. It is well known in the art that an AFCI device detects and trips because of multitude of reasons. This invention discloses a process of visually indicating the fault. After the AFCI device has tripped on a fault, on subsequent power-on the last fault cause or reason is visually indicated.

One important aspect of this invention is that it provides a simple yet effective way to clear the stored fault cause or reason so that subsequent power-on do not display the last fault cause or reason, thereby providing for a factory or production test environment as well as field operational fault clearance method. Alternatively, the LED(s) can be flashed for a specific frequency for a fixed amount of time to provide feedback to the user or operator that the stored fault cause/code has been cleared from the non-volatile memory.

A separate feedback to the user or operator is also disclosed when the push-to-test (PTT) operation results in failure to trip. The LED(s) are flashed at a specific frequency if the PTT operation did not cause a trip in the circuit breaker after a reasonable period of time.

There is a dilemma for users or operators in understanding what caused an arc fault circuit interrupter (AFCI) device to trip in all of the current available designs. This issue is resolved when visual indications provide information about the last fault cause or reason. With this invention, the last fault status is stored in a non-volatile memory for a definite period of time within which service can be provided. This non-invasive visual indication of the last fault cause or reason provides a simple way to relate to users information about the device's history.

The method of storing and displaying the fault raises an important test environment dilemma. Any factory level full breaker tests would also leave unnecessary fault remarks in the breaker. To protect against such intended, as well as, unintended fault reason displays this invention presents a method to clear the last fault cause or reason.

The PTT button on the AFCI provides a way for users or operators to test the functionality of the device. In certain circumstances, such as, the improper functioning of the tripping mechanism or the device fails to trip on a PTT button press, the user or the operator does not get an electronic feedback. This invention also discloses a method wherein the AFCI indicates a flashing indication at specific rate when the tripping mechanism has failed to disengage when the PTT button was pressed during the operation of the device.

The sensor hardware could be similar to that disclosed in U.S. Pat. No. 5,729,145, (Frederick K. Blades), the disclosure of which is incorporated herein by reference. The arc fault circuit interrupter (AFCI) of this invention preferably uses a mixed-signal microprocessor with digital I/O, Embedded Input Comparators and Timers. The microprocessor can be selected from the many that are available in today's market, such as, for example, the ATMEL Tiny 461, the TEXAS INSTRUMENT MSP430F2121, to name a few. Furthermore, the microprocessor should be selected based on the algorithm implementation requirements. The microprocessor input port pin connected to an external push-to-test (PTT) button is monitored during the power on sequence of the device. This invention detects the pressing of the PTT to clear the stored fault cause or reason.

The fault reason or cause is stored during the normal operation of the device in the non-volatile memory storage location of the microprocessor (Flash or EEPROM). The storage of the fault reason happens as and when the corresponding fault is experienced by the device. The presence of either an arc fault or ground fault or a positive response to PTT will cause the device to trip and de-energize the connecting circuit. When the AFCI is turned on for the next time without any other user input, the LEDs show the encoded indication depicting the fault. This display can last a fixed amount of time, such as, for example, 5 seconds, after which the LEDs will turn off.

When the PTT button is pressed and the AFCI device is turned on, the last fault status or trip code from the non-volatile memory location designated to store the fault status is cleared. When the device is turned on after a fault, the pressing of the push-to-test button is monitored. If within, for example, the first 40 ms of the power-on, the push-to-test button is found to be pressed, for example, for at least 20 ms, the memory location for the last fault cause or reason is cleared. Alternately, during the memory clear operation, the LEDs can be flashed at a specific frequency to give a feedback to the user or operator. If however no PTT press is found on power on, the last fault cause or reason is displayed by the LEDs connected to the microprocessor.

During the normal operation of the device, the PTT button is used to test the functionality of the device. After pressing of the PTT button, the device will correctly respond by actuating the tripping mechanism. The microprocessor keeps track of the time elapsed after the PTT button has been pressed, by the form of an internal software counter. After pressing of the PTT button, if the tripping mechanism has failed to disengage power from the device, the microprocessor continues to be powered on. If the internal software counter in the microprocessor has reached a specified time, for example, 250 ms the LEDs connected to the microprocessor start an On-Off flash at a rate of 250 ms. This frequency of flashing indication is easily distinguishable by a healthy human eye. The fault code is stored in the nonvolatile memory when a specific arc fault is recorded.

Figure 1:
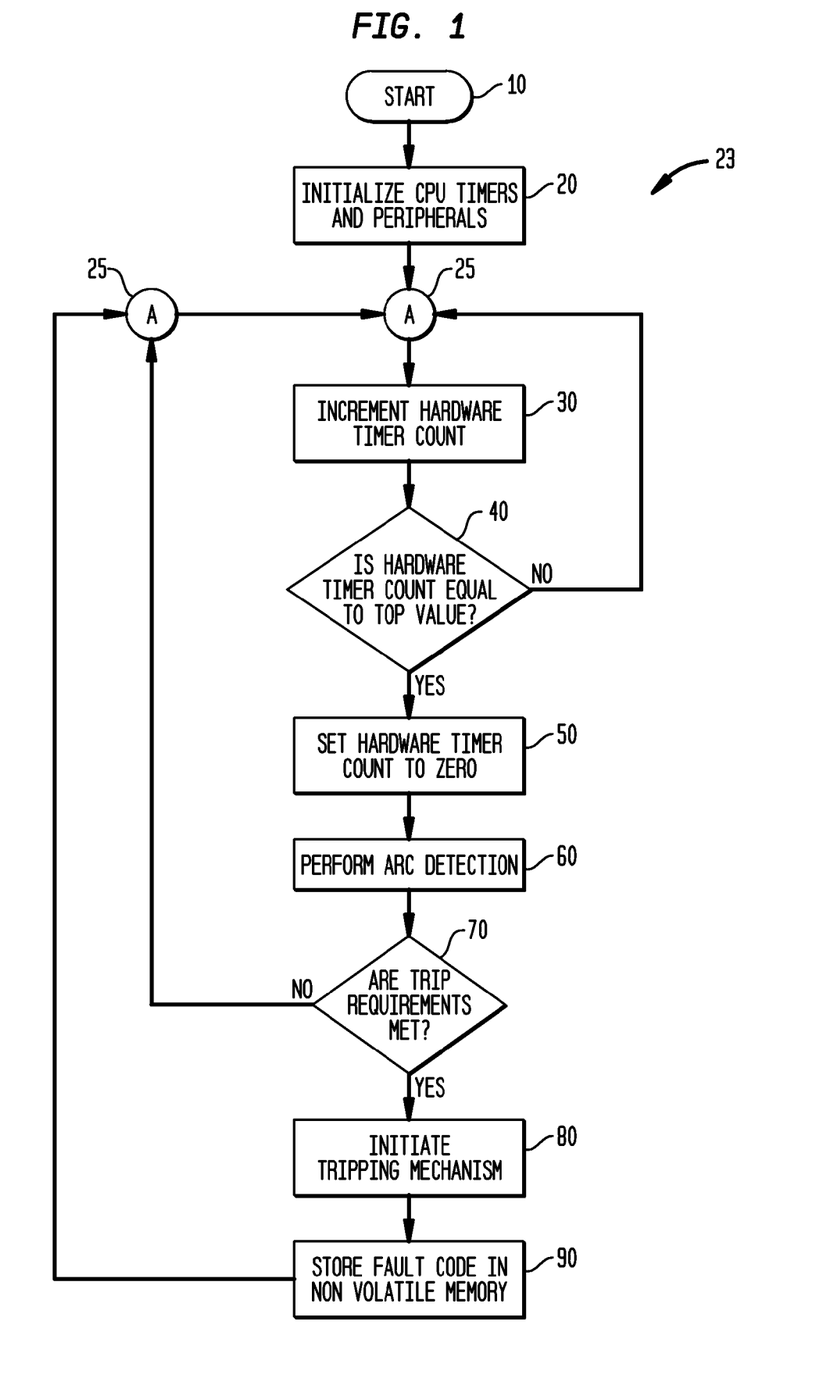
FIG. 1 is a flow chart illustrating a method for storing of the fault code/results in the non-volatile memory (NVM) according to one embodiment of this invention.

FIG. 1 is a flow chart illustrating a method 23 for storing of the fault code/results in the non-volatile memory (NVM) according to one embodiment of this invention. The fault codes can be devised in a way to have unique display capability using the available LEDs. Alternately certain fault codes can be combined so that they can be displayed using the same LEDs. At the start 10, one initializes CPU (Central Processing Unit) timers and peripherals at step 20. The increment hardware timer count is initiated at step 30. At step 40, the hardware timer count is reviewed, if the hardware timer count is equal to top value at step 40, then the hardware timer count is set to zero at step 50. If the answer is "NO" then a message is sent to location 25, to restart the process. Once the hardware timer count is set to zero at step 50, the algorithm performs an arc detection at step 60. The next step is to see if the trip requirements have been met at step 70. If the answer is "YES" then a tripping mechanism is initiated at step 80, and the fault code are stored in a non-volatile memory (NVM) at step 90. If found that the trip requirements are not met at step 70, then a message is sent to location 25, to restart the process. Once the fault code is stored in the non-volatile memory at step 90, it stays there until the next set of information is initiated from the start 10.

Figure 2:
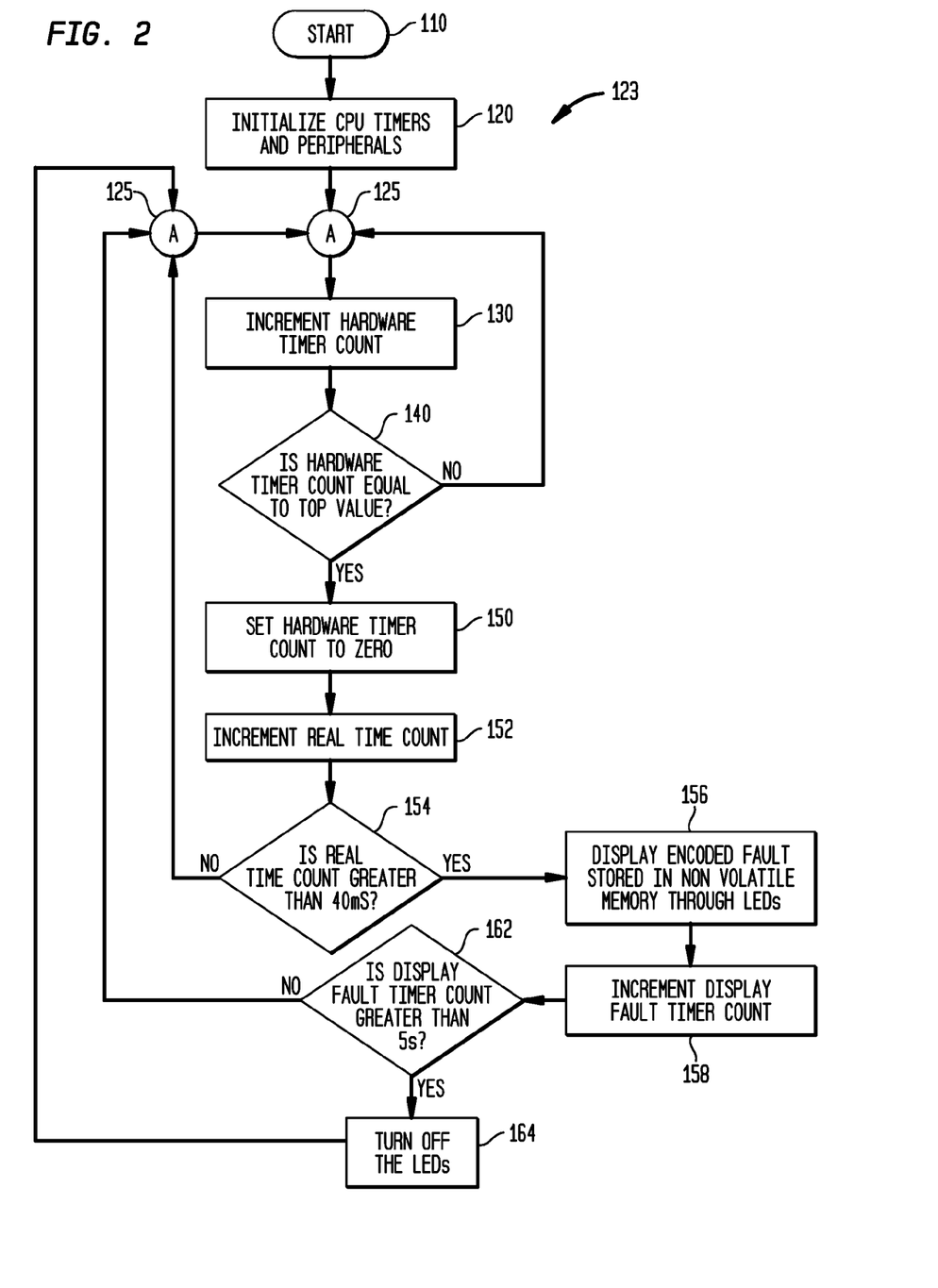
FIG. 2 is a flow chart illustrating the procedure to implement the display of the fault code according to one embodiment of this invention.

FIG. 2 is a flow chart illustrating the procedure 123 to implement the display of the fault code according to one embodiment of this invention. The fault code can be displayed for a fixed amount of time to indicate the last fault cause. For the purposes of illustration only the time is defined as 5 seconds, however, it could be any time that is selected by the user or operator. After this fixed amount of time, the LEDs can be turned off. Once the fault code has been stored in the non-volatile memory, it can be displayed on every power on cycle. The algorithm is started at step 110. The CPU (Central Processor Unit) timers and peripherals are initialized at step 120. Next, at step 130 the increment hardware timer count is started, and at step 140 a check is made to see if the hardware timer count is equal to the top value, if it is, then the hardware timer count is set to zero at step 150. However, if the hardware timer count is not equal to the top value at step 140, then the message is sent to location 125 for reprocessing. After the hardware timer count has been set to zero at step 150, an increment real time count is done at step 152. Next, a check is done at step 154, to see if the real time count is greater than 40 ms, if it is, then the encoded fault stored in non-volatile memory is displayed through LEDs at step 156. The next step is an increment display fault timer count at step 158, followed by the step 162, of checking if the display fault timer count is greater than 5 second, if it is, then the LEDs are turned OFF at step 164. However, if at step 162, the display fault timer count is not greater than 5 seconds, and then a message is sent to location 125 for reprocessing.

The clearing of the last fault display is determined by the user input specifically the PTT button. The PTT button is monitored in conjunction with the powering on of the AFCI device to check if the user is interested in clearing the last stored fault code. The PTT button is monitored with a simple debouncing routine that requires the PTT button to be pressed for a period of time, such as, for example, for the purposes of illustration only, say at least 20 ms.

Figure 3:
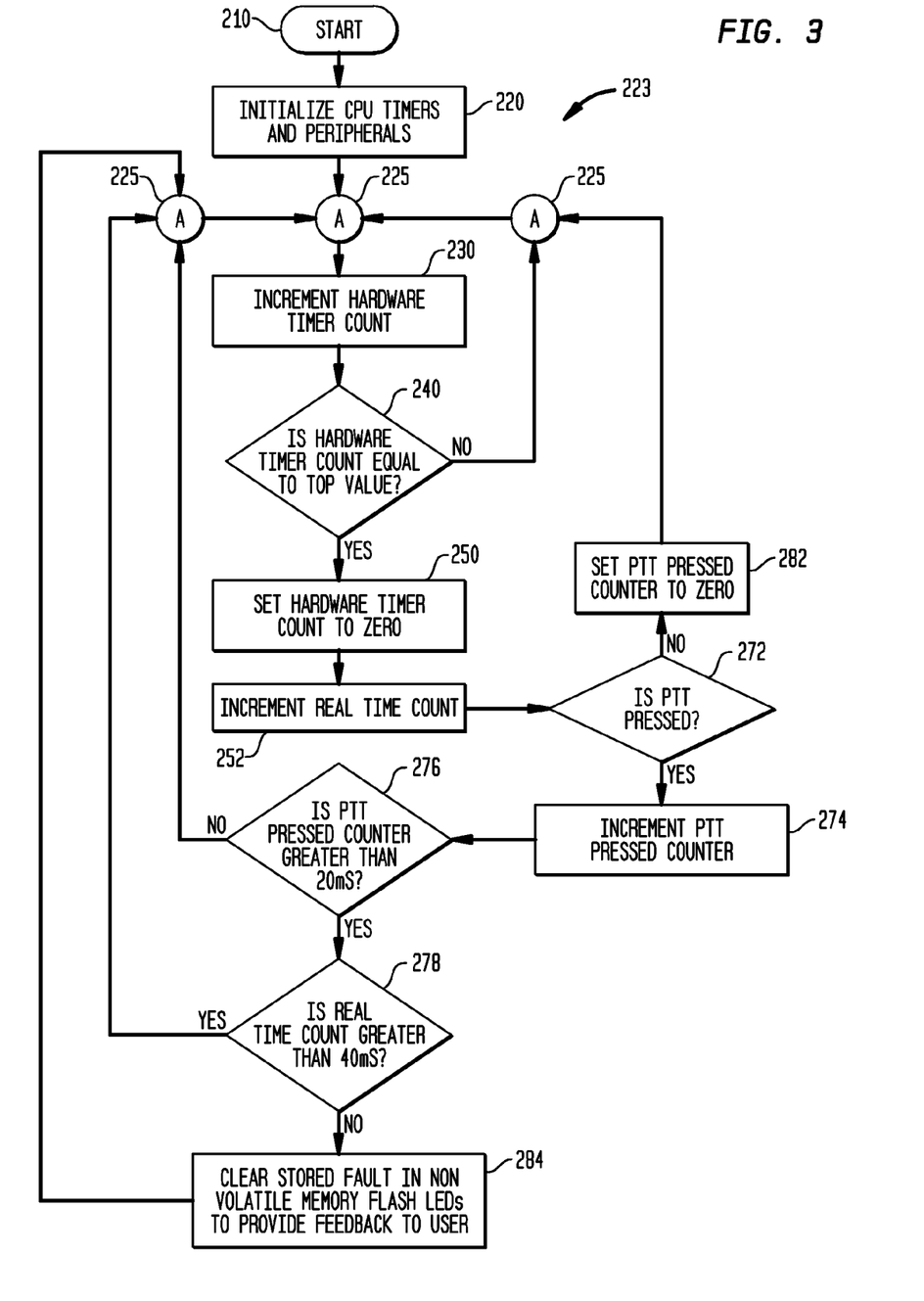
FIG. 3 is a flow chart illustrating a methodology followed in implementing the logic for clearing the last fault cause stored in the non-volatile memory (NVM) according to one embodiment of this invention.

FIG. 3 is a flow chart illustrating a methodology 223 followed in implementing the logic for clearing the last fault cause or reason stored in the non-volatile memory (NVM) according to one embodiment of this invention. The algorithm is started at step 210, which is followed by the initialization of the CPU timers and peripherals at step 220. At step 230, an increment hardware timer count is done, which is followed by the step of checking if the hardware timer count is equal to the top value at step 240, if it is, then the hardware timer count is set to zero at step 250. However, if the hardware timer count is not equal to the top value at step 240, then a message is sent to location 225, for reprocessing. The next step after the hardware timer count is set to zero at step 250, is to do an increment real time count at step 252, followed by an evaluation to see if PTT (Push-to-Test) has been pressed at step 272. If PTT (Push-to-Test) has been pressed at step 272, then an increment PTT pressed counter is initiated at step 274. Next at step 276, an evaluation is made to see if the PTT pressed counter is greater than 20 ms, if it is, then a second evaluation is made at step 278, to see if the real time count is greater than 40 ms. However, if at step 276, it is determined that the PTT pressed counter is not greater than 20 ms, then a message is sent to location 225, for reprocessing. If at step 278, it is determined that the real time count is greater than 40 ms, then a message is sent to location 225, for reprocessing. However, if at step 278, it is determined that the real time count is not greater than 40 ms, then instructions are given to clear stored fault in non-volatile memory and flash LEDs to provide feedback to user at step 284.

During the normal operation of the AFCI, the PTT button can be used to perform regular test of the electronics. If the electronics of the device is compromised to a certain degree and the microprocessor continues to function properly, a visual feedback is implemented as described in FIG. 4. The microprocessor after the PTT operation that has been initiated can trigger a flashing of LEDs to inform the user or operator of the failure of the tripping mechanism.

Figure 4:
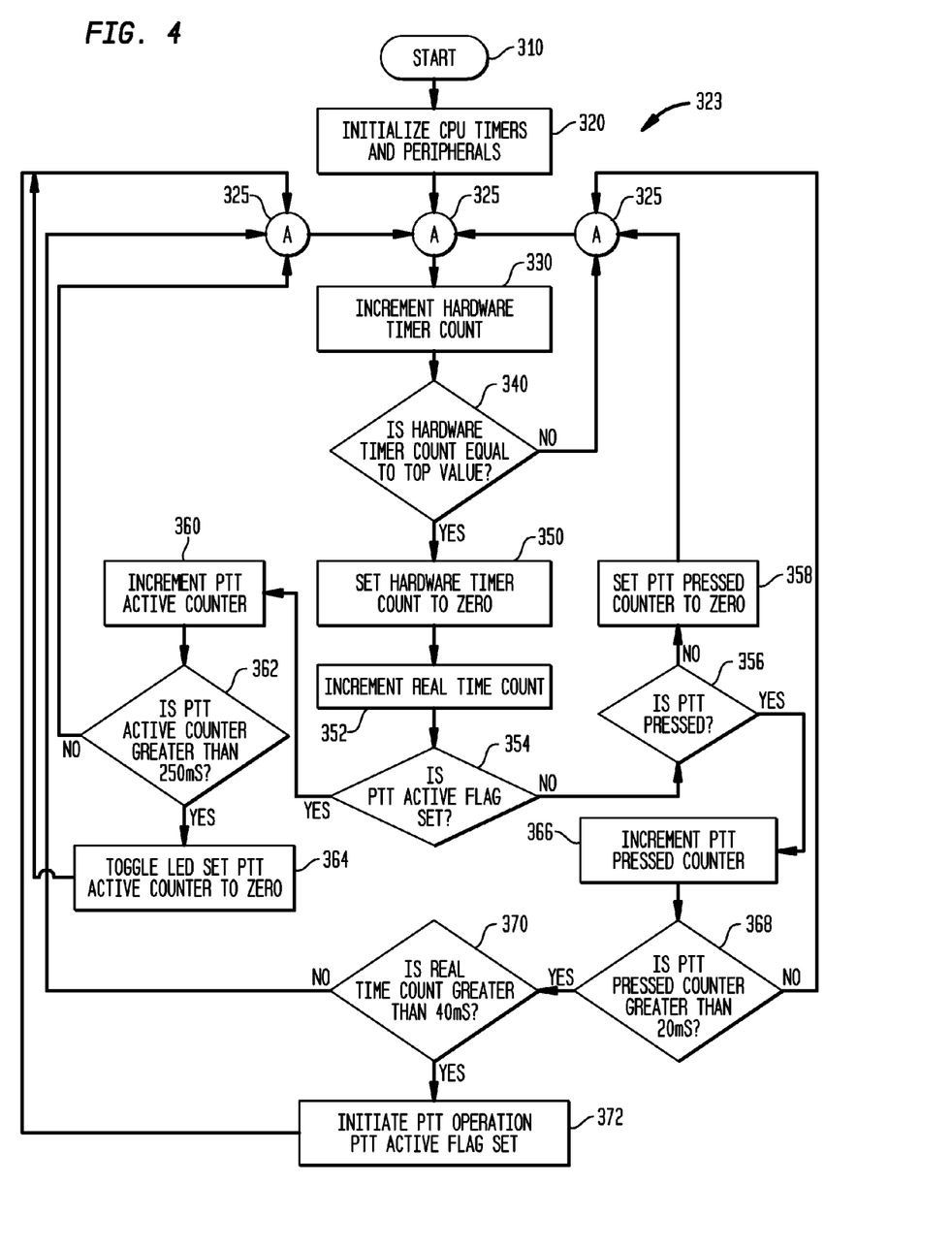
FIG. 4 is a flow chart illustrating the flashing of LEDs to indicate a fault in tripping mechanism according to one embodiment of this invention.

FIG. 4 is a flow chart illustrating method 323 for flashing of LEDs to indicate a fault in the tripping mechanism according to one embodiment of this invention. The algorithm is started at step 310. Next at step 320, the CPU (Central Processing Unit) timers and peripherals are initialized. At step 330, a hardware timer count is incremented. At step 340 a check is made to see if the hardware timer count is equal to the top value, if it is, then the hardware timer count is set to zero at 350. However if the hardware timer count is not equal to the top value at 340, then a message is sent to location 325 for reprocessing. After the hardware timer count has been set to zero at 350, a real time count is incremented at 352. Next, a check is done at 354 to see if the PTT active flag is set. If the PTT active flag is not set, a check is done at 356 to see if the PTT is pressed by the user. If the PTT is pressed by the user, a PTT pressed counter is incremented at step 366. If the PTT is not pressed by the user at step 356, the PTT pressed counter is cleared to zero value at step 358 and a message is sent for reprocessing at step 325. After the PTT pressed counter is incremented at step 366, a check is made at 368 if the PTT pressed counter is greater than 20 ms. If it is, another check is made to check if real time count is greater than 40 ms at step 370. If the PTT pressed counter is less than 20 ms, a message is sent for reprocessing at step 325. If the real time count is greater than 40 ms at step 370, PTT operation is initiated at step 372 and the electronics is tested by the method described in the "user-prompted test request" routine as described in the U.S. patent application Ser. No. 11/978,969 (Carlos Restrepo, et al.), the entire disclosure of which is incorporated herein by reference. At step 372, the PTT active flag is set. After the PTT active flag is set at step 372, a message is sent to step 325 for reprocessing. If at step 370, the real time count is less 40 ms, the message is sent for reprocessing at step 325. If the PTT active flag is found to set at step 354, a PTT active counter is incremented at step 360. A check is made at step 362 if the PTT active counter is greater than 250 ms. If the PTT active counter at step 362 is less than 250 ms, a message is sent for reprocessing at step 325. If however the PTT active counter is greater than 250 ms, at step 364, the LEDs connected to the microprocessor are toggled either On or Off depending on their previous state. Also at step 364, the PTT active counter is cleared to zero and a message is sent to step 325 for reprocessing.

Figure 5:
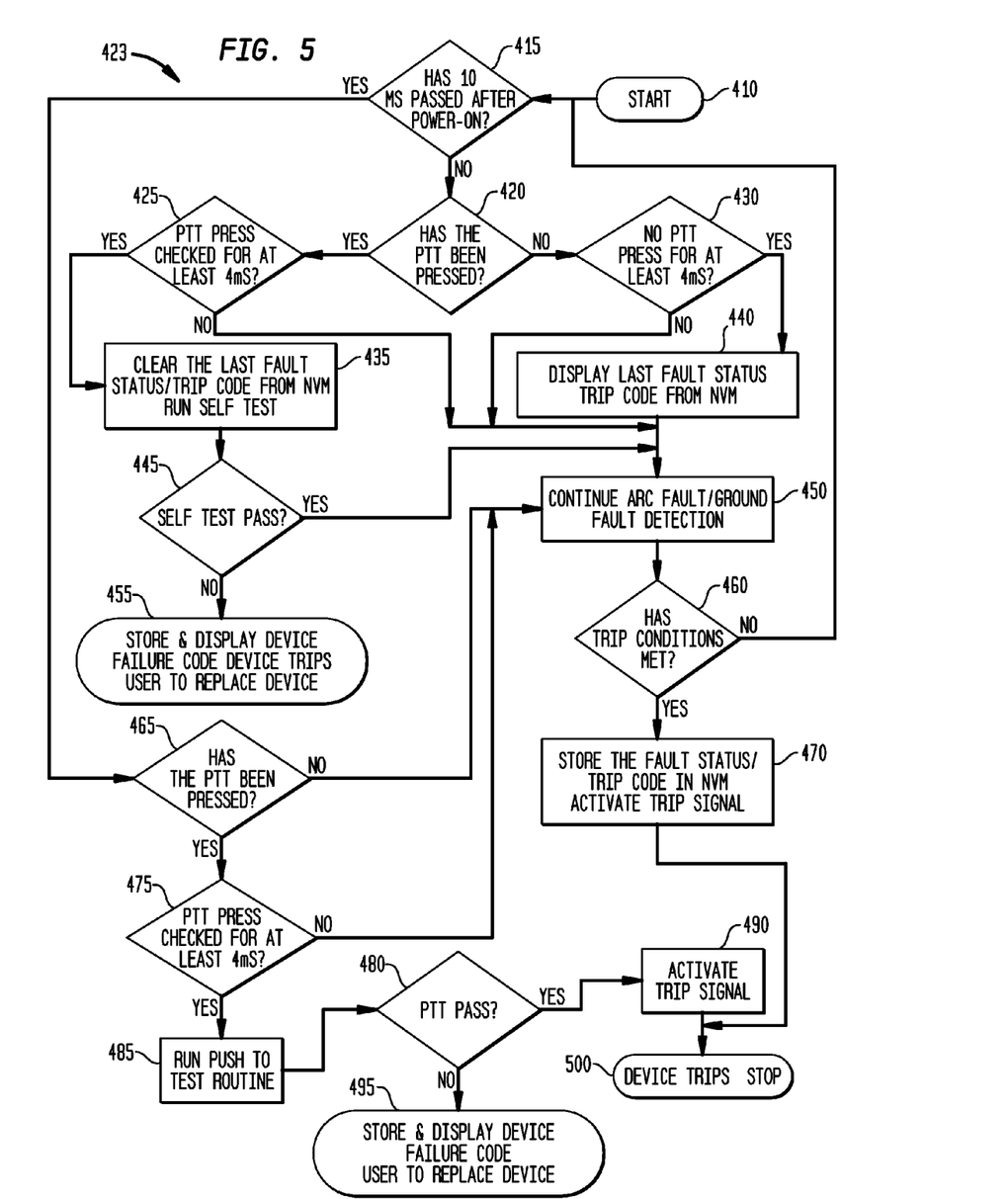
FIG. 5 is a flow chart illustrating the overall integration of various modes of Push-to-Test (PTT) button press operation in the normal functioning of an AFCI according to one embodiment of this invention.

FIG. 5 is a flow chart illustrating the integration of various modes of Push-to-Test (PTT) button press operation in the overall functioning of an AFCI 423 according to one embodiment of this invention. The algorithm is started at step 410. At step 415, an evaluation is made to see if a specific time period, say, for example, 10 ms, has passed after the power-on, if the answer is YES, then an evaluation is made to see if the PTT has been pressed at step 465. However, if the answer is NO, then an evaluation is made to see if the PTT has been pressed at step 420. If it is determined that the PTT has been pressed at step 420, then a check is made at step 425, to determine if the PTT has been pressed for at least a specified time period, for example, 4 ms. Preferably, this time period at step 425 should be less than the time period chosen at step 420. However, if it is determined that the PTT has not been pressed at step 420, then an evaluation is made at step 430, to determine if the PTT has been pressed for at least a specified time period, for example, 4 ms, and if the answer is YES then at step 440, a display of last fault status/trip code from NVM (non-volatile memory) is made. Preferably, the time period chosen in step 430 should be less than the time period chosen at step 420. However, if the answer is NO then a PTT press check for at least 4 ms is done at step 425. At step 425, if it is determined that the PTT press checked for at least 4 ms, then at step 435, instructions are given to clear the last fault status/trip code from NVM, and to run a self test. After step 435, a self test pass check is done at step 445, if the answer is NO, then at step 455, a determination is made to store and display the device failure code, device trips, and instruct user to replace device. However, if at step 455, the device passes the self test, then the process continues to step 450, with instructions to continue arc fault and ground fault detection. If at step 465, it is determined that the PTT has been pressed, then an evaluation is made at step 475, to determine if the PTT has been pressed for at least a specified time period, for example, 4 ms, and if the answer is YES, then a run push-to-test routine is initiated at step 485. The push-to-run test routine is followed by a determination if the PTT has passed at step 480. Preferably, the time period chosen in step 475 should be less than the time period chosen at step 420. If at step 480, the answer is NO then an instruction is given to store and display device failure codes and instruct user to replace device at step 495. However, if the answer is YES at PTT pass, step 480, then instructions are given to activate trip signal at step 490, followed by the tripping of the device and stopping the device at step 500. However, if at step 475, it is determined that the PTT press checked for at least 4 ms, is NO, then the device is instructed to continue arc fault/ground fault detection at step 450. After step 450, an evaluation is made to see if trip conditions have been met at step 460, and if the answer is YES, then at step 470, the device is instructed to store the fault status/trip code in NVM (non-volatile memory), and activate trip signal, and the device trips and stops at step 500. However, if at step 460, the trip conditions have not been met, then the device is instructed to restart the process at step 415.

Figure 6:
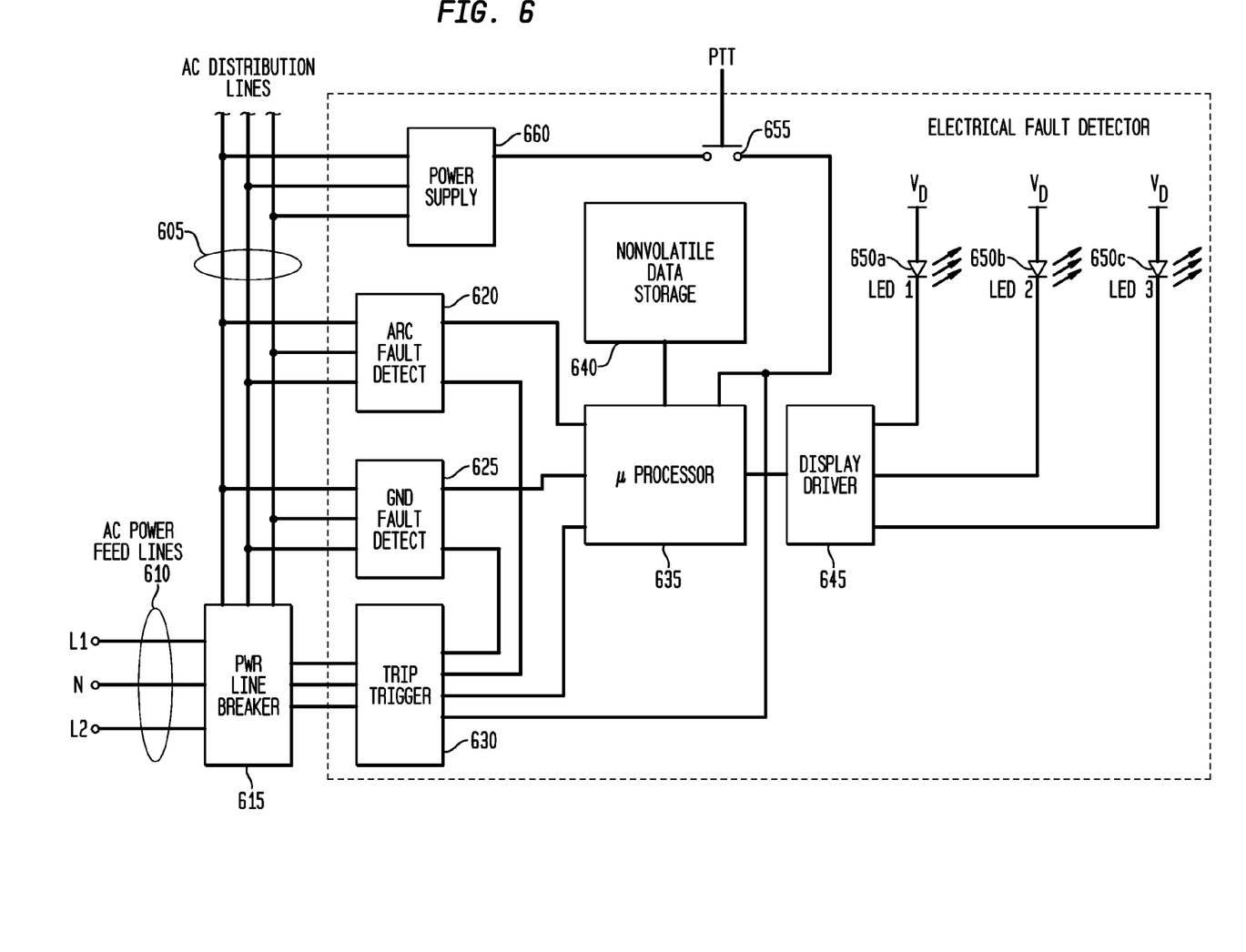
FIG. 6 is a block diagram of an embodiment of electrical fault detection circuit according to one embodiment of this invention.

FIG. 6 is a block diagram of an embodiment of electrical fault detection circuit 600 according to one embodiment of this invention. The electrical fault detection circuit 600 is connected to the AC distribution lines 605. The AC distribution lines are connected to the power line breaker 615 which is connected to the AC power feed lines 610.

The electrical fault detection circuit 600 has an arc fault detector 620 and a ground fault detector 625 that are connected to the AC distribution lines 605. The arc fault detector 610 determines whether an arc fault is present on the AC distribution lines 605 and the ground fault detector determines if a ground fault is present within the AC distribution lines 605. The arc fault detector 610 and the ground fault detector 615 are connected to the trip trigger circuit 620. The trip trigger circuit 620 is connected to the power line breaker 625. The trip trigger 620 activates the power line breaker 625 when the arc fault detector 610 and/or the ground fault detector 615 respectively indicate an arc fault and/or ground fault is present on the AC distribution lines 605 to disconnect the AC distribution lines 605 from the AC power feed lines 610.

The arc fault detector 620, the ground fault detector 625, and the trip trigger 630 are connected to the microprocessor 635. The microprocessor contains timers and peripherals necessary to execute the methods described in FIGS. 1 through 6. The microprocessor is connected to the nonvolatile data storage 640. In some embodiments, the nonvolatile data storage 640 is a separate nonvolatile random access memory circuit (RAM) or a nonvolatile RAM circuit integrated into the microprocessor 635 chip or package. The microprocessor 635 is as described above.

The microprocessor 635 receives a detection signal from the arc fault detector 620 and the ground fault detector 625 and generates a fault code that is transferred to the nonvolatile data storage 640. The microprocessor 635 then activates the display driver to transfer the appropriate fault code to the display light emitting diodes (LED) 650a, 650b, and 650c according to the appropriate fault codes. For instance, the LED 650a may be designated for an arc fault and the LED 650b may be designated for a ground fault. The trip trigger 630 may also be connected to the microprocessor 635 to determine the condition of the trip trigger 630 and the power line breaker 615. Any failure of the trip trigger 630 and the power line breaker 615 may be indicated with an appropriate fault code that is displayed by the LEDs 650a, 650b, and 650c.

A push-to-test activator switch 655 is connected to the microprocessor 635 and the trip trigger 630. The push-to-test activator switch 655 is actuated to test the condition of the power line breaker 615. The push-to-test activator switch 655 is further used by the microprocessor 635 to indicate the nonvolatile data storage 640 should be cleared as described in FIGS. 4 and 5. The push-to-test activator switch 655 has one contact connected to the power supply 660 to receive a biasing voltage that indicates whether the push-to-test activator switch 655 is actuated. The activator of the push-to-test activator switch 655 permits the connecting of the power supply 660 to the contact connected that is connected to the microprocessor 635 push-to-test activator switch 655.

Initialize CPU Timers and Peripherals

The microprocessor's clock is set at the internal oscillator maximum allowable value (for example 8 MHz). A clock based hardware timer module of the processor is used to count as soon as the timer is enabled after power on. The timer module is configured to count to a specified count (defined as Top value for the microprocessor timer). The timer resets to zero value when it has reached its Top value. The ports for input as well outputs of the microprocessor are enabled. This enables the microprocessor to read as well output signals on its ports. The hardware timer is configured to generate an interrupt every instant it reaches its specified Top value. This timer interrupt causes the processor to service an interrupt service routine. In the interrupt service routine the PTT input pin of the microprocessor are read.

In the interrupt service routine, a software counter is updated as well. This software counter acts as "real time count" actuated from the time the processor is ready to run. If the PTT input is detected to be pressed, a separate "PTT-pressed software counter" is started. If the PTT input is detected to be released, the "PTT-pressed software counter" is reset to zero.

PTT Debouncing

Once the PTT is found to be pressed, a debouncing routine checks if PTT input was considered pressed because of electronic noise or an actual user input. A user input for PTT press will cause a change of state of the PTT input of the microprocessor for longer than 20 ms. An electronic noise is likely to cause a change of state of the PTT input for less than 20 ms. This is used to define the debouncing routine.

In the interrupt service routine, if the PTT input is detected to be pressed, a "PTT-pressed software counter" is incremented. If the PTT input is detected to be released, the "PTT-pressed software counter" is reset to zero. The debouncing routine checks the "PTT-pressed software counter" value. If the "PTT-pressed software counter" value is greater than 20 ms, the PTT has been actuate from a user input.

Clear Last Fault

When the PTT button is pressed and the AFCI device is turned on, the last fault status or trip code from the non-volatile memory location designated to store the fault status is cleared. The location of the fault status can be chosen at the start of the application and is editable during compile time of the application software. The various fault status/trip code are also clearly defined during compile time.

The clearing of the last fault is implemented in the microprocessor by keeping track of the "real time count" and the "PTT-pressed software counter." If the "real time count" is less than 40 ms and the "PTT-pressed software counter" is greater than 20 ms, it is determined that the PTT button was pressed when the AFCI device was turned on. This implies a real user intention of clearing the last fault.

Once the determination has been made that the user intended to clear the memory content, the microprocessor replaces the non-volatile memory location which contains the fault code with a code representing "no fault."

Display Last Fault

If the "real time count" is more than 40 ms, the last fault stored in the non-volatile memory is displayed using a series of LEDs which are connected as outputs to the microprocessor. The display of the LEDs is a visual indication of the reason the previous fault or device trip occurred. The invention states that the LEDs can be turned on for a specific time. For the purpose of user convenience, this time is set for 5 seconds, after which the LEDs can be turned off by the microprocessor.

Feedback of Push-to-Test Failure

If the "real time count" is more than 40 ms, pressing of the PTT button on the device will trigger a push-to-test routine. This "user-prompted test request" routine is also described in the U.S. patent application Ser. No. 11/978,969 (Carlos Restrepo, et al.), the entire disclosure of which is incorporated herein by reference. A successful user-prompted test will result in a trip signal and thus fully testing all aspects of the electronics providing GFCI and/or AFCI protection.

If a failure occurs in the push-to-test routine, then the device will fail to trip. Since the push-to-test is a user initiated test, a failure to trip as expected will be noticed by the user. Furthermore, to accentuate the failure, the microprocessor also sends a signal to the LEDs to perform an On-Off cycle every 250 ms. This redundant feature can emphasize the need to replace the failed device from operation and replace it with a working device.

When the PTT button has been debounced as explained earlier the microprocessor initiates a "PTT-active counter." This "PTT-active counter" is also incremented every instant the timer interrupt service routine is encountered. Furthermore, when the "PTT-active counter" reaches, for example, 250 ms, the microprocessor toggles the LEDs. The LEDs change state every 250 ms. The process is repeated until power is disconnected from the circuit breaker.

When the microprocessor activates the "Failure-to-trip counter," the "Failure-to-trip counter" is also incremented every time the timer interrupt service routine is encountered. If the "Failure-to-trip counter" reaches 250 ms, the LEDs are turned off by the microprocessor. The process is repeated until power is connected to the microprocessor.

As an alternative a microprocessor based embodiment, a mixed signal ASIC embodiment is also possible. This embodiment would use a hardware-only solution replacing the microprocessor and software.

The method of clearing the stored fault status can be extensively used in factory conditions where the devices during mass productions can be tested for their proper functioning. It is likely that the devices would be subjected to arc like test conditions. The simulated or real arc/ground fault testing environment will cause the device to trip/de-energize and the fault cause or reason would be stored in the non-volatile memory.

Before the device is sent out of the production site, the stored fault cause or reason should be cleared. It should be appreciated that during the production cycle the arc fault circuit interrupter devices has been subjected to a whole gamut of arc/ground fault conditions, but, when it is sent to the user or operator it is cleared of all testing results.

Once this inventive device has been deployed, the device is preferably tested regularly by pressing the PTT button. Also, the device might experience a real fault when in operation, and it is in the interest of the user or operator to clear the non-volatile memory by the clear memory operation so that future faults can be displayed through the LEDs.

The use of LEDs allows the instant invention to encode conditions and further provide more information for the operator or user. This allows the user or operator to easily troubleshoot and quickly find the root cause. The visual encoding can be provided to the user or operator in a troubleshooting guide. A single LED may designate an arc fault. A dual LED may designate a ground fault.

The simplicity of the visual indicators and display of this invention alleviates the amount of information necessary to be relayed to the end user and requires less education on their part to properly handle and understand the AFCI. Furthermore, the steadily lit separate LEDs make it easier to analyze the fault that had caused the device to trip and had removed power from the circuit.

While in operation, the AFCI of this invention has the capability of displaying a "failure to trip" by the tripping mechanism on a PTT operation. The LEDs flash at a single frequency. This flashing of the indicators provides a way for the user or operator, such as, a homeowner or electrician, to understand the failure of the device and immediately replace the device.

The visual display of the fault on power on does not require extensive communication protocol, such as, RS-232, and also does not require mounting such ports on the device, thereby keeping the process of fault reading non-invasive and the device simple and less bulky. The combination of the push-to-test (PTT) and the reset button using a single button in the instant invention simplifies the design and reduces the level of confusion while the device is in operation.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An arc fault detector, comprising:
   (a) means for repeatedly measuring an elapsed time;
   (b) at least one means to perform arc detection at each repeated elapsed time;
   (c) means for initiating a tripping mechanism, if tripping requirements are met based on at least one input from said at least one means to perform the arc detection; and
   (d) means for generating at least one fault code; and
   (e) at least one non-volatile memory for storing said fault code.

2. The arc fault detector of claim 1, wherein said fault code is selected from a group consisting of an arc fault interrupt code, a ground fault interrupt code, and a push-to-test interrupt code.

3. The arc fault detector of claim 1, wherein said arc fault detector has at least one means to display said fault code.

4. The arc fault detector of claim 3, wherein said at least one means for displaying said fault code is at least one LED.

5. The arc fault detector of claim 4, wherein at least a first LED indicates an arc fault interrupt code.

6. The arc fault detector of claim 5, wherein at least a second LED indicates a ground fault interrupt code.

7. The arc fault detector of claim 6, wherein at least a third LED indicates a push-to-test interrupt code.

8. An arc fault detector, comprising:
   (a) means for repeatedly measuring elapsed time;
   (b) at least one means to perform arc detection at each repeated elapsed time;
   (d) means for initiating a tripping mechanism, if tripping requirements are met based on at least one input from said arc detection performance; and
   (e) means for generating at least one fault code;
   (f) at least one non-volatile memory for storing said fault code; and
   (g) at least one means for displaying said fault code stored in said at least one non-volatile memory after a first period of time.

9. The arc fault detector of claim 8, wherein said at least one means for displaying said fault code is at least one LED.

10. The arc fault detector of claim 8, wherein said first period of time is at least 40 ms.

11. The arc fault detector of claim 8, wherein said fault code stored in said at least one non-volatile memory is displayed via said at least one means for displaying said fault code for at least a second period of time.

12. The arc fault detector of claim 11 wherein said at least second period of time is at least 5 seconds.

13. An arc fault detector, comprising:
   (a) means for measuring repeatedly elapsed time;
   (b) at least one means to perform arc detection at each repeated elapsed time;
   (c) means for initiating a tripping mechanism, if tripping requirements are met based on at least one input from said at least one means for performing arc detection; and
   (d) means for generating a fault code;
   (e) at least one non-volatile memory for storing said fault code;
   (f) at least one means to determine a third period of time when the fault code stored in the at least one non-volatile memory is to be cleared; and
   (g) at least one means to determine that a push-to-test activator has been actuated for at least a fourth period of time; and
   (h) at least one means to clear said fault code stored in said at least one non-volatile memory; and
   (i) at least one means to display said fault code stored in said at least one non-volatile memory.

14. The arc fault detector of claim 13, wherein said fourth period of time is at least 20 ms.

15. The arc fault detector of claim 14, wherein said memory hold time value is at least 40 ms.

16. The arc fault detector of claim 13, wherein said means for displaying said fault code is a single indicator that displays an arc fault, and a dual indicator that displays a ground fault.

17. The arc fault detector of claim 16, wherein said means for displaying said fault code is at least one indicator activated at a single frequency to indicate that said arc fault detector has failed.

18. A method for detecting electrical faults comprising:
   (a) repeatedly measuring an elapsed time;
   (b) detecting at least one electrical fault at each repeated elapsed time;
   (c) initiating a tripping mechanism, if tripping requirements are met based on detecting at least one electrical fault; and
   (d) generating at least one fault code upon detecting at least one electrical fault; and
   (e) storing said fault code in at least one non-volatile memory.

19. The method for detecting electrical faults of claim 18, wherein said fault code is selected from a group consisting of an arc fault interrupt code, a ground fault interrupt code, and a push-to-test interrupt code.

20. The method for detecting electrical faults of claim 18, further comprising displaying visually said fault code.

21. The method for detecting electrical faults of claim 20, wherein displaying visually said fault code comprises activating at least one LED.

22. The method for detecting electrical faults of claim 18, wherein displaying visually said fault code comprises activating at least a first LED to indicate an arc fault interrupt code.

23. The method for detecting electrical faults of claim 22, wherein displaying visually said fault code comprises activating at least a second LED to indicate a ground fault interrupt code.

24. The method for detecting electrical faults of claim 18, wherein displaying visually said fault code comprises activating at least a third LED to indicate a push-to-test interrupt code.

25. A method for detecting electrical faults, comprising:
(a) repeatedly measuring elapsed time;
(b) performing electrical fault detection at each repeated elapsed time;
(d) initiating a tripping mechanism, if tripping requirements are met based performing electrical fault detection; and
(e) generating at least one fault code upon detecting at least one electrical fault;
(f) storing said fault code at least one non-volatile memory; and
(g) displaying said fault code stored in said at least one non-volatile memory after a first period of time.

26. The method for detecting electrical faults of claim 25, wherein displaying said fault code is activating at least one LED.

27. The method for detecting electrical faults of claim 25, wherein said first period of time is at least 40 ms.

28. The method for detecting electrical faults of claim 25, wherein displaying said fault code comprises activating a display for at least a second period of time.

29. The method for detecting electrical faults of claim 28, wherein said at least second period of time is at least 5 seconds.

30. A method for detecting electrical faults, comprising:
(a) measuring repeatedly elapsed time;
(b) performing electrical fault detection at each repeated elapsed time;
(c) initiating a tripping mechanism, if tripping requirements are met based performing electrical fault detection; and
(d) generating at fault code upon detecting a fault;
(e) storing said fault code in at least one non-volatile memory;
(f) determining a third period of time when the fault code stored in the at least one non-volatile memory is to be cleared; and
(g) determining that a push-to-test activator has been actuated for at least a fourth period of time; and
(h) clearing said fault code stored in said at least one non-volatile memory; and
(i) displaying said fault code stored in said at least one non-volatile memory.

31. The method for detecting electrical faults of claim 30, wherein said fourth period of time is at least 20 ms.

32. The method for detecting electrical faults of claim 30, further comprising determining if said third period of time is greater than a memory hold time value; and then clearing said fault code stored in said at least one non-volatile memory.

33. The method for detecting electrical faults of claim 32, wherein the memory hold time value is at least 40 ms.

34. The method for detecting electrical faults of claim 30, wherein displaying said fault code comprises activating a single indicator that displays an arc fault, and activating a dual indicator that displays a ground fault.

35. The method for detecting electrical faults of claim 34, wherein displaying said fault code comprises activating at least one indicator at a single frequency to indicate that means for detecting electrical faults has failed.

* * * * *